(12) United States Patent
Qing et al.

(10) Patent No.: US 11,577,653 B2
(45) Date of Patent: Feb. 14, 2023

(54) STEP APPARATUS FOR VEHICLE AND VEHICLE

(71) Applicant: T-MAX (HANGZHOU) TECHNOLOGY CO., LTD., Zhejiang (CN)

(72) Inventors: Zhaobo Qing, Zhejiang (CN); Huizhong Yang, Zhejiang (CN)

(73) Assignee: T-MAX (HANGZHOU) TECHNOLOGY CO., LTD., Zhejiang (CN)

(*) Notice: Subject to any disclaimer, the term of this patent is extended or adjusted under 35 U.S.C. 154(b) by 37 days.

(21) Appl. No.: 17/317,426

(22) Filed: May 11, 2021

(65) Prior Publication Data
US 2021/0347303 A1    Nov. 11, 2021

(30) Foreign Application Priority Data

May 11, 2020   (CN) .......................... 202010393579.8
May 11, 2020   (CN) .......................... 202020771882.2

(51) Int. Cl.
*B60R 3/02*    (2006.01)
*B60S 9/10*    (2006.01)

(52) U.S. Cl.
CPC . *B60R 3/02* (2013.01); *B60S 9/10* (2013.01)

(58) Field of Classification Search
CPC .................................... B60R 3/02; B60S 9/10
See application file for complete search history.

(56) References Cited

U.S. PATENT DOCUMENTS

| | | |
|---|---|---|
| 7,591 A | 8/1850 | Burdett |
| 634,385 A | 10/1899 | Wolfe et al. |
| 724,155 A | 3/1903 | Besse |
| 752,031 A | 2/1904 | Chadwick |
| 817,224 A | 4/1906 | Clifford |
| 955,658 A | 4/1910 | Mitchell et al. |

(Continued)

FOREIGN PATENT DOCUMENTS

| | | |
|---|---|---|
| CA | 1021826 | 11/1977 |
| CA | 2082177 | 5/1994 |

(Continued)

OTHER PUBLICATIONS

International Search Report and Written Opinion of the International Searching Authority for PCT International Application No. PCT/CN2015/097930 dated May 10, 2016.

(Continued)

*Primary Examiner* — Bryan A Evans
(74) *Attorney, Agent, or Firm* — Perkins Coie LLP

(57) ABSTRACT

A step apparatus for a vehicle and a vehicle are provided. The step apparatus for the vehicle includes: a step; a lifting device including an arm assembly, the arm assembly including a plurality of pairs of arms, each pair of arms including a first arm and a second arm; and a driver pivotably connected to a first end of the first arm and a first end of the second arm of each pair of arms. A second end of the second arm of each pair of arms is pivotably connected to the step, a second end of the first arm of each pair of arms is pivotably connected to the vehicle, and the driver is configured to drive the arm assembly to be unfolded and folded to adjust a level of the step.

20 Claims, 5 Drawing Sheets

(56) References Cited

U.S. PATENT DOCUMENTS

| | | |
|---|---|---|
| 1,063,643 A | 6/1913 | Blake et al. |
| 1,169,140 A | 1/1916 | Fassett et al. |
| 1,176,538 A | 3/1916 | Warner |
| 1,182,169 A | 5/1916 | Hansen |
| 1,222,127 A | 4/1917 | Perri |
| 1,239,892 A | 9/1917 | Dunderdale |
| 1,242,828 A | 10/1917 | Lyle |
| 1,250,604 A | 12/1917 | Lorenc |
| 1,268,335 A | 6/1918 | Fairchild |
| 1,364,697 A | 1/1921 | Branch |
| 1,437,648 A | 12/1922 | Gore |
| 1,449,031 A | 3/1923 | Blake |
| 1,471,972 A | 10/1923 | Miller |
| 1,509,235 A | 9/1924 | Giuliani |
| 1,621,479 A | 3/1927 | Cleveland et al. |
| 1,755,942 A | 4/1930 | Woolson |
| 1,800,162 A | 4/1931 | Stroud |
| 2,029,745 A | 2/1936 | Stiner |
| 2,041,640 A | 5/1936 | Goss |
| 2,118,557 A | 5/1938 | Hamilton |
| 2,122,040 A | 6/1938 | Machovec |
| 2,125,085 A | 7/1938 | Pool |
| 2,197,266 A | 4/1940 | Fredell |
| 2,209,576 A | 7/1940 | McDonald |
| 2,246,986 A | 6/1941 | Pellegrini |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,645,504 A | 7/1953 | Branstrator et al. |
| 2,669,613 A | 2/1954 | Despard |
| 2,678,832 A | 5/1954 | Wright |
| 2,682,671 A | 7/1954 | Faure |
| 2,764,422 A | 9/1956 | McDonald |
| 2,774,494 A | 12/1956 | Malmström |
| 2,825,582 A | 3/1958 | McDonald |
| 2,921,643 A | 1/1960 | Vanderveld |
| 2,925,876 A | 2/1960 | Wagner |
| 2,998,265 A | 8/1961 | Kozicki |
| 3,008,533 A | 11/1961 | Haberle |
| 3,012,633 A | 12/1961 | Magee |
| 3,039,562 A | 6/1962 | Wagner |
| 3,095,216 A | 6/1963 | Browne et al. |
| 3,164,394 A | 1/1965 | Husko |
| 3,172,499 A | 3/1965 | Stairs |
| 3,266,594 A | 8/1966 | Antosh et al. |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,515,406 A | 6/1970 | Endsley |
| 3,517,942 A | 6/1970 | Cuffe et al. |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,650,423 A | 3/1972 | O'Brien |
| 3,671,058 A | 6/1972 | Kent |
| 3,745,595 A | 7/1973 | Nagy |
| 3,756,622 A | 9/1973 | Pyle et al. |
| 3,762,742 A | 10/1973 | Bucklen |
| 3,784,227 A | 1/1974 | Rogge |
| 3,799,288 A | 3/1974 | Manuel |
| 3,807,757 A | 4/1974 | Carpenter et al. |
| 3,833,240 A | 9/1974 | Weiler |
| 3,853,369 A | 12/1974 | Holden |
| 3,863,890 A | 2/1975 | Ruffing |
| 3,865,399 A | 2/1975 | Way |
| 3,869,022 A | 3/1975 | Wallk |
| 3,869,169 A | 3/1975 | Johnson et al. |
| 3,887,217 A | 6/1975 | Thomas |
| 3,889,997 A | 6/1975 | Schoneck |
| 3,891,261 A | 6/1975 | Finneman |
| 3,913,497 A | 10/1975 | Maroshick |
| 3,915,475 A | 10/1975 | Casella et al. |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 3,986,724 A | 10/1976 | Rivinius |
| 3,997,211 A | 12/1976 | Graves |
| 4,020,920 A | 5/1977 | Abbott |
| 4,053,172 A | 10/1977 | McClure |
| 4,058,228 A | 11/1977 | Hall |
| 4,068,542 A | 1/1978 | Brand et al. |
| 4,073,502 A | 2/1978 | Frank et al. |
| 4,089,538 A | 5/1978 | Eastridge |
| 4,098,346 A | 7/1978 | Stanfill |
| 4,103,872 A | 8/1978 | Hirasuka |
| 4,106,790 A | 8/1978 | Weiler |
| 4,110,673 A | 8/1978 | Nagy et al. |
| 4,116,457 A | 9/1978 | Nerem et al. |
| 4,124,099 A | 11/1978 | Dudynskyj |
| 4,145,066 A | 3/1979 | Shearin |
| 4,164,292 A | 8/1979 | Karkau |
| 4,168,764 A | 9/1979 | Walters |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,194,754 A | 3/1980 | Hightower |
| 4,205,862 A | 6/1980 | Tarvin |
| 4,219,104 A | 8/1980 | MacLeod |
| 4,231,583 A | 11/1980 | Learn |
| 4,275,664 A | 6/1981 | Reddy |
| 4,325,668 A | 4/1982 | Julian et al. |
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |
| 4,982,974 A | 1/1991 | Guidry |
| 4,991,890 A | 2/1991 | Paulson |
| D316,394 S | 4/1991 | Carr |
| 5,005,667 A | 4/1991 | Anderson |
| 5,005,850 A | 4/1991 | Baughman |
| 5,007,654 A | 4/1991 | Sauber |
| 5,028,063 A | 7/1991 | Andrews |
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| 5,253,973 A | 10/1993 | Fretwell |
| D340,905 S | 11/1993 | Orth et al. |
| 5,257,767 A | 11/1993 | McConnell |
| 5,257,847 A | 11/1993 | Yonehara |
| 5,261,779 A | 11/1993 | Goodrich |

(56) References Cited

U.S. PATENT DOCUMENTS

| | | | |
|---|---|---|---|
| 5,280,934 | A | 1/1994 | Monte |
| 5,284,349 | A | 2/1994 | Bruns et al. |
| 5,286,049 | A | 2/1994 | Khan |
| 5,342,073 | A | 8/1994 | Poole |
| 5,358,268 | A | 10/1994 | Hawkins |
| 5,375,864 | A | 12/1994 | McDaniel |
| 5,423,463 | A | 6/1995 | Weeks |
| 5,425,615 | A | 6/1995 | Hall et al. |
| 5,439,342 | A | 8/1995 | Hall et al. |
| 5,441,124 | A * | 8/1995 | Rubin ................... B60S 9/10 180/287 |
| 5,462,302 | A | 10/1995 | Leitner |
| 5,478,124 | A | 12/1995 | Warrington |
| 5,498,012 | A | 3/1996 | McDaniel et al. |
| 5,501,475 | A | 3/1996 | Bundy |
| 5,505,476 | A | 4/1996 | Maccabee |
| 5,513,866 | A | 5/1996 | Sisson |
| 5,538,100 | A | 7/1996 | Hedley |
| 5,538,265 | A | 7/1996 | Chen et al. |
| 5,538,269 | A | 7/1996 | McDaniel et al. |
| 5,547,040 | A | 8/1996 | Hanser et al. |
| 5,549,312 | A | 8/1996 | Garvert |
| 5,584,493 | A | 12/1996 | Demski et al. |
| 5,601,300 | A | 2/1997 | Fink et al. |
| 5,624,127 | A | 4/1997 | Arreola et al. |
| 5,697,623 | A | 12/1997 | Bermes et al. |
| 5,697,626 | A | 12/1997 | McDaniel |
| 5,727,840 | A | 3/1998 | Ochiai et al. |
| 5,779,208 | A | 7/1998 | McGraw |
| 5,842,709 | A | 12/1998 | Maccabee |
| 5,876,051 | A | 3/1999 | Sage |
| 5,897,125 | A | 4/1999 | Bundy |
| 5,937,468 | A | 8/1999 | Wiedeck et al. |
| 5,941,342 | A | 8/1999 | Lee |
| 5,957,237 | A | 9/1999 | Tigner |
| 5,980,449 | A | 11/1999 | Benson et al. |
| 5,988,970 | A | 11/1999 | Holtom |
| 6,012,545 | A | 1/2000 | Faleide |
| 6,027,090 | A | 2/2000 | Liu |
| 6,042,052 | A | 3/2000 | Smith et al. |
| 6,055,780 | A | 5/2000 | Yamazaki |
| 6,065,924 | A | 5/2000 | Budd |
| 6,082,693 | A | 7/2000 | Benson et al. |
| 6,082,751 | A | 7/2000 | Hanes et al. |
| 6,112,152 | A | 8/2000 | Tuttle |
| 6,135,472 | A | 10/2000 | Wilson et al. |
| 6,149,172 | A | 11/2000 | Pascoe et al. |
| 6,158,756 | A | 12/2000 | Hansen |
| 6,168,176 | B1 | 1/2001 | Mueller |
| 6,170,842 | B1 | 1/2001 | Mueller |
| 6,179,312 | B1 | 1/2001 | Paschke et al. |
| 6,179,546 | B1 | 1/2001 | Citrowske |
| 6,203,040 | B1 | 3/2001 | Hutchins |
| 6,213,486 | B1 | 4/2001 | Kunz et al. |
| 6,224,317 | B1 | 5/2001 | Kann |
| 6,264,222 | B1 | 7/2001 | Johnston et al. |
| 6,270,099 | B1 | 8/2001 | Farkash |
| 6,325,397 | B1 | 12/2001 | Pascoe |
| 6,352,295 | B1 | 3/2002 | Leitner |
| 6,357,992 | B1 | 3/2002 | Ringdahl et al. |
| 6,375,207 | B1 | 4/2002 | Dean et al. |
| 6,412,799 | B1 | 7/2002 | Schrempf |
| 6,422,342 | B1 | 7/2002 | Armstrong et al. |
| 6,425,572 | B1 | 7/2002 | Lehr |
| 6,430,164 | B1 | 8/2002 | Jones et al. |
| 6,435,534 | B1 | 8/2002 | Stone |
| 6,439,342 | B1 | 8/2002 | Boykin |
| 6,460,915 | B1 | 10/2002 | Bedi et al. |
| 6,471,002 | B1 | 10/2002 | Weinermen |
| 6,511,086 | B2 | 1/2003 | Schlicht |
| 6,511,402 | B2 | 1/2003 | Shu |
| 6,513,821 | B1 | 2/2003 | Heil |
| 6,533,303 | B1 | 3/2003 | Watson |
| 6,536,790 | B1 | 3/2003 | Ojanen |
| 6,588,783 | B2 | 7/2003 | Fichter |
| 6,612,596 | B2 | 9/2003 | Jeon et al. |
| 6,641,158 | B2 | 11/2003 | Leitner |
| 6,659,484 | B2 | 12/2003 | Knodle et al. |
| 6,663,125 | B1 | 12/2003 | Cheng |
| 6,746,033 | B1 | 6/2004 | McDaniel |
| 6,769,704 | B2 | 8/2004 | Cipolla |
| 6,810,995 | B2 | 11/2004 | Warford |
| 6,812,466 | B2 | 11/2004 | O'Connor et al. |
| 6,830,257 | B2 | 12/2004 | Leitner |
| 6,834,875 | B2 | 12/2004 | Leitner |
| 6,840,526 | B2 | 1/2005 | Anderson et al. |
| 6,874,801 | B2 | 4/2005 | Fichter |
| 6,880,843 | B1 | 4/2005 | Greer, Jr. |
| 6,912,912 | B2 | 7/2005 | Reichinger et al. |
| 6,918,624 | B2 | 7/2005 | Miller et al. |
| 6,926,295 | B2 | 8/2005 | Berkebile et al. |
| 6,938,909 | B2 | 9/2005 | Leitner |
| 6,942,233 | B2 | 9/2005 | Leitner et al. |
| 6,942,272 | B2 | 9/2005 | Livingston |
| 6,948,903 | B2 | 9/2005 | Ablabutyan et al. |
| 6,951,357 | B2 | 10/2005 | Armstrong et al. |
| 6,955,370 | B2 | 10/2005 | Fabiano et al. |
| 6,959,937 | B2 | 11/2005 | Schneider et al. |
| 6,966,597 | B2 | 11/2005 | Tegtmeier |
| 6,971,652 | B2 | 12/2005 | Bobbert et al. |
| 6,997,469 | B2 | 2/2006 | Lanoue et al. |
| 7,000,932 | B2 | 2/2006 | Heil et al. |
| 7,007,961 | B2 | 3/2006 | Leitner |
| 7,017,927 | B2 | 3/2006 | Henderson et al. |
| 7,055,839 | B2 | 6/2006 | Leitner |
| 7,090,276 | B1 | 8/2006 | Bruford et al. |
| 7,111,859 | B2 | 9/2006 | Kim et al. |
| 7,118,120 | B2 | 10/2006 | Lee et al. |
| 7,163,221 | B2 | 1/2007 | Leitner |
| 7,258,386 | B2 | 8/2007 | Leitner |
| 7,287,771 | B2 | 10/2007 | Lee et al. |
| 7,360,779 | B2 | 4/2008 | Crandall |
| 7,367,574 | B2 | 5/2008 | Leitner |
| 7,380,807 | B2 | 6/2008 | Leitner |
| 7,398,985 | B2 | 7/2008 | Leitner et al. |
| 7,413,204 | B2 | 8/2008 | Leitner |
| 7,416,202 | B2 | 8/2008 | Fichter |
| 7,487,986 | B2 | 2/2009 | Leither et al. |
| 7,516,703 | B2 | 4/2009 | Tazreiter |
| 7,566,064 | B2 | 7/2009 | Leitner et al. |
| 7,584,975 | B2 | 9/2009 | Leitner |
| 7,594,672 | B2 | 9/2009 | Piotrowski |
| 7,621,546 | B2 | 11/2009 | Ross et al. |
| 7,637,519 | B2 | 12/2009 | Leitner et al. |
| 7,673,892 | B2 | 3/2010 | Kuntze et al. |
| 7,717,444 | B2 | 5/2010 | Fichter |
| 7,740,261 | B2 | 6/2010 | Leitner et al. |
| 7,793,596 | B2 | 9/2010 | Hirtenlehner |
| 7,823,896 | B2 | 11/2010 | VanBelle |
| 7,874,565 | B2 | 1/2011 | Duncan |
| D634,687 | S | 3/2011 | Vukel |
| 7,900,944 | B2 | 3/2011 | Watson |
| 7,909,344 | B1 | 3/2011 | Bundy |
| 7,934,737 | B2 | 5/2011 | Okada |
| 7,976,042 | B2 | 7/2011 | Watson et al. |
| 8,038,164 | B2 | 10/2011 | Stahl et al. |
| 8,042,821 | B2 | 10/2011 | Yang |
| D649,100 | S | 11/2011 | Cheng |
| 8,052,162 | B2 | 11/2011 | Yang et al. |
| 8,056,913 | B2 | 11/2011 | Kuntze et al. |
| 8,070,173 | B2 | 12/2011 | Watson |
| 8,136,826 | B2 | 3/2012 | Watson |
| 8,146,935 | B1 | 4/2012 | Adams |
| 8,157,277 | B2 | 4/2012 | Leitner et al. |
| 8,177,247 | B1 | 5/2012 | Carr |
| 8,205,901 | B2 | 6/2012 | Yang et al. |
| D665,713 | S | 8/2012 | Pochurek et al. |
| 8,262,113 | B1 | 9/2012 | Chafey et al. |
| 8,297,635 | B2 | 10/2012 | Agoncillo et al. |
| D671,874 | S | 12/2012 | Kekich et al. |
| 8,342,550 | B2 | 1/2013 | Stickles et al. |
| 8,342,551 | B2 | 1/2013 | Watson et al. |
| 8,360,455 | B2 | 1/2013 | Leitner et al. |
| 8,408,571 | B2 | 4/2013 | Leitner et al. |

(56) References Cited

U.S. PATENT DOCUMENTS

| | | |
|---|---|---|
| 8,419,034 B2 | 4/2013 | Leitner et al. |
| 8,469,380 B2 | 6/2013 | Yang et al. |
| 8,602,431 B1 | 12/2013 | May |
| 8,827,294 B1 | 9/2014 | Leitner et al. |
| 8,833,782 B2 | 9/2014 | Huotari et al. |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 9,156,406 B2 | 10/2015 | Stanesic et al. |
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,764,691 B2 | 9/2017 | Stickles et al. |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2 | 4/2018 | Leitner et al. |
| 9,975,742 B1 | 5/2018 | Mason |
| 10,010,467 B2 | 7/2018 | Sato |
| 10,049,505 B1 | 8/2018 | Harvey |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,735 B2 | 11/2018 | Du et al. |
| 10,124,839 B2 | 11/2018 | Povinelli et al. |
| 10,140,618 B2 | 11/2018 | Crawford |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,384,614 B1 | 8/2019 | Du et al. |
| 10,427,607 B2 | 10/2019 | Otacioglu |
| 10,539,285 B1 | 1/2020 | Johnson |
| 10,576,879 B1 | 3/2020 | Salter |
| 10,618,472 B2 | 4/2020 | Du |
| 10,649,483 B2 | 5/2020 | Liu et al. |
| 10,682,960 B2 | 6/2020 | Du |
| 10,821,904 B2 | 11/2020 | Du |
| 10,885,759 B1 | 1/2021 | Lee |
| 11,021,108 B2 | 6/2021 | Du |
| 11,198,394 B2 | 12/2021 | Du et al. |
| 11,208,043 B2 | 12/2021 | Du et al. |
| 11,292,390 B2 | 4/2022 | Du et al. |
| 11,318,889 B2 | 5/2022 | Du et al. |
| 11,414,017 B2 | 8/2022 | Qing et al. |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0231149 A1 | 10/2005 | Numauchi |
| 2005/0280242 A1 | 12/2005 | Fabiano et al. |
| 2006/0082096 A1 | 4/2006 | Sukonthapanich et al. |
| 2006/0214386 A1 | 9/2006 | Watson |
| 2006/0219484 A1 | 10/2006 | Ogura |
| 2006/0284440 A1 | 12/2006 | Leitner |
| 2007/0017743 A1* | 1/2007 | Yeh .................. B60R 3/02 182/127 |
| 2008/0042396 A1 | 2/2008 | Watson |
| 2008/0100023 A1 | 5/2008 | Ross |
| 2008/0100025 A1 | 5/2008 | Leitner et al. |
| 2009/0250896 A1 | 10/2009 | Watson |
| 2009/0295114 A1 | 12/2009 | Yang et al. |
| 2009/0295115 A1 | 12/2009 | Yang et al. |
| 2010/0044993 A1 | 2/2010 | Watson |
| 2011/0115187 A1 | 5/2011 | Leitner et al. |
| 2011/0246021 A1 | 10/2011 | Prokhorov |
| 2012/0025485 A1 | 2/2012 | Yang et al. |
| 2012/0046846 A1 | 2/2012 | Dollens |
| 2013/0154230 A1 | 6/2013 | Ziaylek |
| 2015/0094898 A1 | 4/2015 | Tellis |
| 2015/0097353 A1 | 4/2015 | Rasmussen et al. |
| 2015/0137482 A1 | 5/2015 | Woolf |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2016/0280190 A1 | 9/2016 | Franz |
| 2017/0008459 A1 | 1/2017 | Leitner et al. |
| 2017/0021781 A1 | 1/2017 | Du |
| 2017/0036605 A1 | 2/2017 | Du |
| 2017/0036606 A1 | 2/2017 | Du |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0095457 A1 | 4/2018 | Lee |
| 2018/0118530 A1 | 5/2018 | August |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0293811 A1 | 10/2018 | Liu |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0292026 A1 | 9/2019 | Felps |
| 2020/0023779 A1 | 1/2020 | Du et al. |
| 2020/0023780 A1 | 1/2020 | Du et al. |
| 2020/0047674 A1 | 2/2020 | Du et al. |
| 2020/0262354 A1 | 8/2020 | Du et al. |
| 2020/0265658 A1 | 8/2020 | Du et al. |
| 2020/0269763 A1 | 8/2020 | Du et al. |
| 2020/0277169 A1 | 9/2020 | Zhan |
| 2020/0282814 A1 | 9/2020 | Alban et al. |
| 2020/0282913 A1 | 9/2020 | Qing |
| 2020/0290424 A1 | 9/2020 | Zhan |
| 2020/0299116 A1 | 9/2020 | Fan |
| 2020/0282914 A1 | 10/2020 | Du et al. |
| 2020/0331396 A1 | 10/2020 | Du et al. |
| 2021/0078591 A1 | 3/2021 | Du et al. |
| 2021/0213885 A1 | 7/2021 | Du et al. |
| 2021/0347303 A1 | 11/2021 | Qing et al. |

(56) References Cited

U.S. PATENT DOCUMENTS

| | | | |
|---|---|---|---|
| 2021/0347304 | A1 | 11/2021 | Qing et al. |
| 2022/0194299 | A1 | 6/2022 | Du et al. |
| 2022/0219612 | A1 | 7/2022 | Du et al. |

FOREIGN PATENT DOCUMENTS

| | | |
|---|---|---|
| CA | 2218280 A1 | 6/1999 |
| CA | 2332193 A1 | 9/2001 |
| CA | 2370618 A1 | 11/2007 |
| CN | 2174368 Y | 8/1994 |
| CN | 2806241 Y | 8/2006 |
| CN | 1976833 A | 6/2007 |
| CN | 101279594 A | 10/2008 |
| CN | 102394918 A | 3/2012 |
| CN | 202806579 U | 3/2013 |
| CN | 103507719 A | 1/2014 |
| CN | 203728468 U | 7/2014 |
| CN | 104192070 A | 12/2014 |
| CN | 2044474223 U | 7/2015 |
| CN | 105083136 A | 11/2015 |
| CN | 105083137 A | 11/2015 |
| CN | 105128751 A | 12/2015 |
| CN | 105450762 A | 3/2016 |
| CN | 106249641 A | 12/2016 |
| CN | 106499293 A | 3/2017 |
| CN | 107601333 A | 1/2018 |
| CN | 207361653 U | 5/2018 |
| CN | 108263303 A | 7/2018 |
| CN | 108454518 A | 8/2018 |
| CN | 207758678 U | 8/2018 |
| CN | 108583446 A | 9/2018 |
| CN | 108632335 A | 10/2018 |
| CN | 108791086 A | 11/2018 |
| CN | 208037900 U | 11/2018 |
| CN | 108973868 A | 12/2018 |
| CN | 208232903 U | 12/2018 |
| CN | 109253888 A | 1/2019 |
| CN | 208325054 U | 1/2019 |
| CN | 208344082 U | 1/2019 |
| CN | 208532082 U | 2/2019 |
| DE | 1042403 B | 10/1958 |
| DE | 1220276 B | 6/1966 |
| DE | 2555468 A1 | 6/1977 |
| DE | 7922488 U1 | 7/1982 |
| DE | 3151621 A1 | 7/1983 |
| DE | 3932142 | 4/1990 |
| DE | 8910933 U1 | 10/1990 |
| EP | 0066493 | 12/1982 |
| EP | 373842 A1 | 6/1990 |
| EP | 0418615 A1 | 3/1991 |
| EP | 0559624 B1 | 8/1995 |
| EP | 0966367 A1 | 9/1998 |
| EP | 0901783 A2 | 3/1999 |
| EP | 1116840 A2 | 7/2001 |
| EP | 1213185 B1 | 12/2004 |
| EP | 3002157 | 4/2016 |
| EP | 3176038 B1 | 1/2019 |
| EP | 3237254 B1 | 2/2019 |
| FR | 1271901 A | 9/1961 |
| FR | 1350593 A | 12/1963 |
| FR | 2225612 A | 8/1974 |
| FR | 2651739 A1 | 3/1991 |
| FR | 2764254 A1 | 12/1998 |
| GB | 191315077 | 8/1913 |
| GB | 254426 | 7/1926 |
| GB | 340162 A | 12/1930 |
| GB | 381672 | 10/1932 |
| GB | 745918 | 3/1956 |
| GB | 934387 | 8/1963 |
| GB | 936846 | 9/1963 |
| GB | 987846 A | 3/1965 |
| GB | 1430813 A | 4/1976 |
| GB | 1471256 A | 4/1977 |
| GB | 2045699 A | 11/1980 |
| GB | 2055705 A | 3/1981 |
| GB | 2129378 | 5/1984 |
| GB | 2201511 A | 9/1988 |
| GB | 2288014 A | 10/1995 |
| IN | 201741011829 | 10/2018 |
| JP | 63-255144 A | 10/1988 |
| JP | H04138944 A | 5/1992 |
| JP | H04339040 A | 11/1992 |
| JP | H04342629 A | 11/1992 |
| JP | H05310061 A | 11/1993 |
| JP | H05310081 A | 11/1993 |
| JP | H08132967 A | 5/1996 |
| JP | H10287182 A | 10/1998 |
| JP | 2018-177089 A | 11/2018 |
| JP | 2019-001222 A | 1/2019 |
| KR | 2000-0003099 | 1/2000 |
| KR | 101719102 B1 | 3/2017 |
| MX | 2017001699 A | 8/2018 |
| MX | 2017001700 A | 8/2018 |
| MX | 2017006328 A | 8/2018 |
| MX | 2017008032 A | 9/2018 |
| MX | 2017010183 A | 9/2018 |
| SU | 403594 | 11/1973 |
| SU | 783097 A1 | 11/1980 |
| WO | 1988/05759 A1 | 8/1988 |
| WO | 1995/00359 A1 | 1/1995 |
| WO | 1997/027139 A1 | 7/1997 |
| WO | 1998/43856 A2 | 10/1998 |
| WO | 2000/047449 A1 | 8/2000 |
| WO | 2001/000441 A1 | 1/2001 |
| WO | 2003/039910 A1 | 5/2003 |
| WO | 2003/039920 A1 | 5/2003 |
| WO | 2003/066380 A1 | 8/2003 |
| WO | 2003/069294 A1 | 8/2003 |
| WO | 2006/050297 A2 | 5/2006 |
| WO | 2009/103163 A1 | 8/2009 |
| WO | 2017/176226 A1 | 10/2017 |
| WO | 2018/148643 A1 | 8/2018 |
| WO | 2018/197393 A1 | 11/2018 |
| WO | 2019/009131 A1 | 1/2019 |
| WO | 2019/034493 A1 | 2/2019 |

OTHER PUBLICATIONS

U.S. Office Action dated Nov. 18, 2019 for U.S. Appl. No. 16/510,775, filed Jul. 12, 2019. (9 pages).

U.S. Office Action dated Dec. 20, 2019 for U.S. Appl. No. 16/655,149, filed Oct. 16, 2019. (11 pages).

International Search Report and Written Opinion of the International Searching Authority for PCT International Application No. PCT/CN2019/075535 dated Nov. 11, 2019. (English translation, p. 1-21).

International Search Report of the International Searching Authority for PCT International Application No. PCT/CN2019/077842 dated Oct. 12, 2019. (English Translation, p. 1-20).

International Search Report and Written Opinion of the International Searching Authority for PCT International Application No. PCT/CN2019/082919 dated Oct. 11, 2019. (English Translation, p. 1-20).

U.S. Office Action dated Jun. 9, 2020 for U.S. Appl. No. 16/826,094, filed Mar. 20, 2020 (10 pages).

U.S. Office Action dated Jun. 9, 2020 for U.S. Appl. No. 15/931,474, filed May 13, 2020 (12 pages).

U.S. Notice of Allowance for U.S. Appl. No. 16/510,775 dated Feb. 3, 2020.

U.S. Notice of Allowance for U.S. Appl. No. 16/655,149 dated Feb. 20, 2020.

U.S. Notice of Allowance for U.S. Appl. No. 16/826,083 dated Oct. 9, 2020.

Australian Application No. 2019250149 Office Action dated Oct. 6, 2020, pp. 1-4).

Final Office Action dated Oct. 27, 2020 for U.S. Appl. No. 15/931,474, filed Oct. 27, 2020 (13 pages).

Final Office Action dated Feb. 16, 2021 for U.S. Appl. No. 16/826,094, filed Mar. 20, 2020 (15 pages).

Non-Final Office Action dated Jun. 10, 2021 for U.S. Appl. No. 16/517,527, filed Jul. 19, 2019 (6 pages).

(56) References Cited

OTHER PUBLICATIONS

U.S. Appl. No. 16/742,632 Notice of Allowance dated Jun. 29, 2021, pp. 1-7.
Chinese Application No. 201910125764.6 Office Action dated May 6, 2021, pp. 1-13.

* cited by examiner

STEP APPARATUS FOR VEHICLE AND VEHICLE

CROSS-REFERENCE TO RELATED APPLICATIONS

This application claims the benefit of priority to Chinese Patent Application Nos. 202020771882.2 and 202010393579.8, each filed on May 11, 2020, of which the content of each application is incorporated herein by reference in its entirety and for all purposes.

TECHNICAL FIELD

The present disclosure relates to a field of vehicle technologies, and more particularly to a step apparatus for a vehicle and a vehicle having the same.

BACKGROUND

A vehicle step is usually arranged on a chassis under a door to assist a person in getting into or out of a vehicle. The vehicle step is driven by an extension and retraction mechanism to move between an extended position and a retracted position, and the extension and retraction mechanism is connected to the chassis of the vehicle. In the related art, the vehicle step is driven by the extension and retraction mechanism, and the extended position is located below and at an outer side of the retracted position. Such design may attribute the vehicle step with poor stability, as the extension and retraction mechanism has a complex structure, poor flexibility, and poor applicability.

SUMMARY

An aspect of the present disclosure provides a step apparatus for a vehicle.

Another aspect of the present disclosure also provides a vehicle.

The step apparatus for the vehicle according to an embodiment of the first aspect of the present disclosure includes: a step; a lifting device including an arm assembly, the arm assembly including a plurality of pairs of arms, each pair of arms including a first arm and a second arm; and a driver pivotably connected to a first end of the first arm and a first end of the second arm of each pair of arms, a second end of the second arm of each pair of arms being pivotably connected to the step, a second end of the first arm of each pair of arms being pivotably connected to the vehicle, and the driver being configured to drive the arm assembly to be unfolded and folded to adjust a level of the step. The plurality of pairs of arms include at least a first driving arm pair and a second driving arm pair, the first driving arm pair and the second driving arm pair configured in at least one of following manners: the second end of the first arm of the first driving arm pair and the second end of the first arm of the second driving arm pair are connected through gear transmission; and/or, the second end of the second arm of the first driving arm pair and the second end of the second arm of the second driving arm pair are connected through gear transmission.

The vehicle according to an embodiment of the second aspect of the present disclosure includes: a vehicle body; a step apparatus for a vehicle. The step apparatus for the vehicle is mounted to a bottom surface of the vehicle body. The step apparatus for the vehicle includes: a step; a lifting device including an arm assembly, the arm assembly including a plurality of pairs of arms, each pair of arms including a first arm and a second arm; and a driver pivotably connected to a first end of the first arm and a first end of the second arm of each pair of arms, a second end of the second arm of each pair of arms being pivotably connected to the step, a second end of the first arm of each pair of arms being pivotably connected to the vehicle, and the driver being configured to drive the arm assembly to be unfolded and folded to adjust a level of the step. The plurality of pairs of arms include at least a first driving arm pair and/or a second driving arm pair, the first driving arm pair and the second driving arm pair configured in at least one of following manners: the second end of the first arm of the first driving arm pair and the second end of the first arm of the second driving arm pair are connected through gear transmission; and/or, the second end of the second arm of the first driving arm pair and the second end of the second arm of the second driving arm pair are connected through gear transmission.

DETAILED DESCRIPTION

Figure 1:
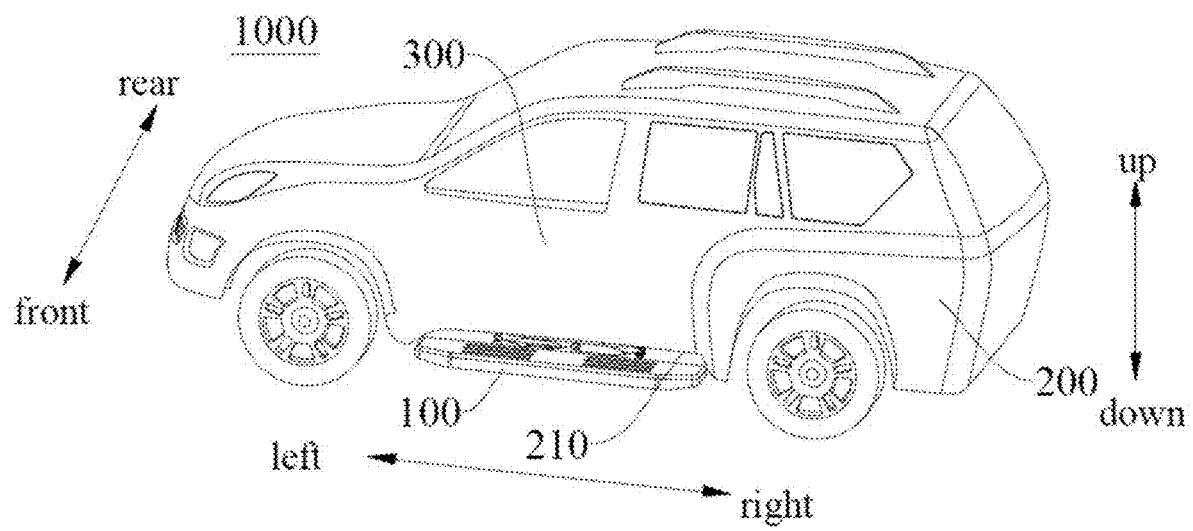
FIG. 1 is a perspective view of a vehicle according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. In the specification, it should be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," "circumferential," etc., should be construed to refer to the orientations or positions as illustrated in the drawings. These relative terms are for convenience of description and do not require that the present disclosure should be constructed or operated in a particular orientation, so the terms are not to be construed as a limit to the present disclosure.

A step apparatus for a vehicle and a vehicle according to an embodiment of the present disclosure will be described with reference to the accompanying drawings.

As illustrated in FIGS. 1 to 4, a vehicle 1000 according to an embodiment of the present disclosure includes a vehicle body 200 and a step apparatus 100 for a vehicle. The step apparatus 100 for the vehicle is arranged with respect to a bottom surface 210 of the vehicle body, that is, a vehicle chassis, such that the step apparatus 100 is attachable to the bottom surface 210 of the vehicle body.

As illustrated in FIGS. 1 to 4, the vehicle 1000 includes a door 300, and the step apparatus 100 for the vehicle is arranged adjacent to and located below the door 300 and attached or mounted to the vehicle 1000 in such location below the door 300. In the example embodiment illustrated in FIGS. 1 to 4, the vehicle 1000 has two doors 300, and the door 300 is a side door. The present disclosure is not limited to this. For example, the vehicle 1000 may have four doors (side doors) 300, with two side doors 300 arranged on each side of the vehicle body 200, and one step apparatus 100 for the vehicle arranged on each side of the vehicle body 200. In some embodiments, the vehicle 1000 may also have a back door (not illustrated), and the step apparatus 100 for the vehicle adjacent to the back door may be arranged at the rear of the vehicle body 200.

The step apparatus for the vehicle according to the embodiment of the present disclosure will be described below.

Figure 5:
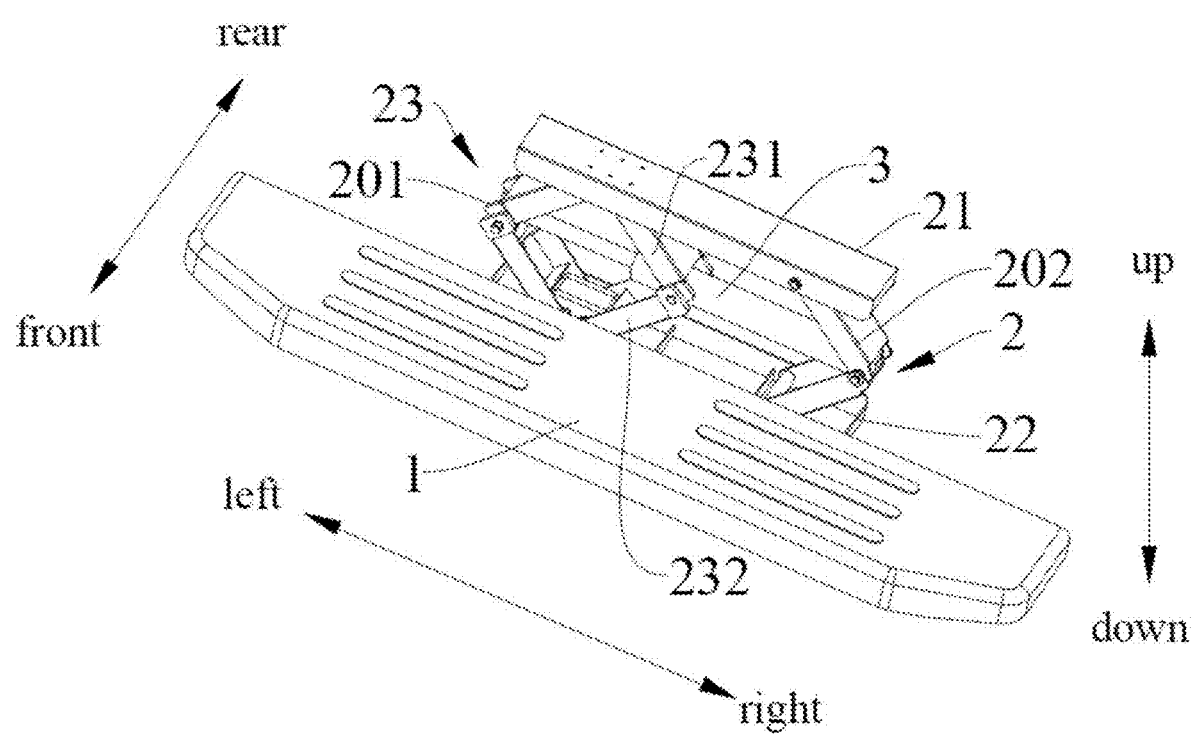
FIG. 5 is a schematic view of a step apparatus for a vehicle according to an embodiment of the present disclosure.
Figure 6:
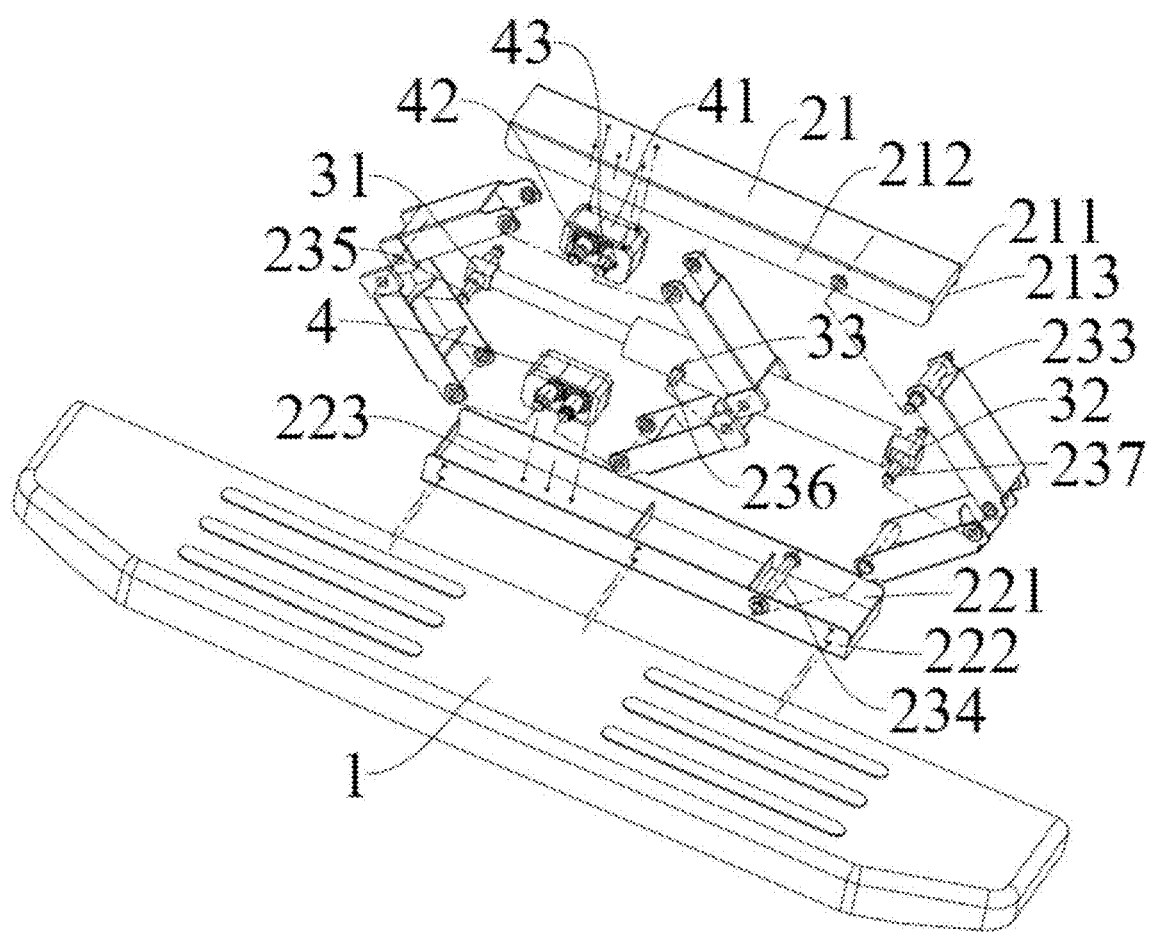
FIG. 6 is an exploded view of the step apparatus for a vehicle illustrated in FIG. 5.
Figure 7:
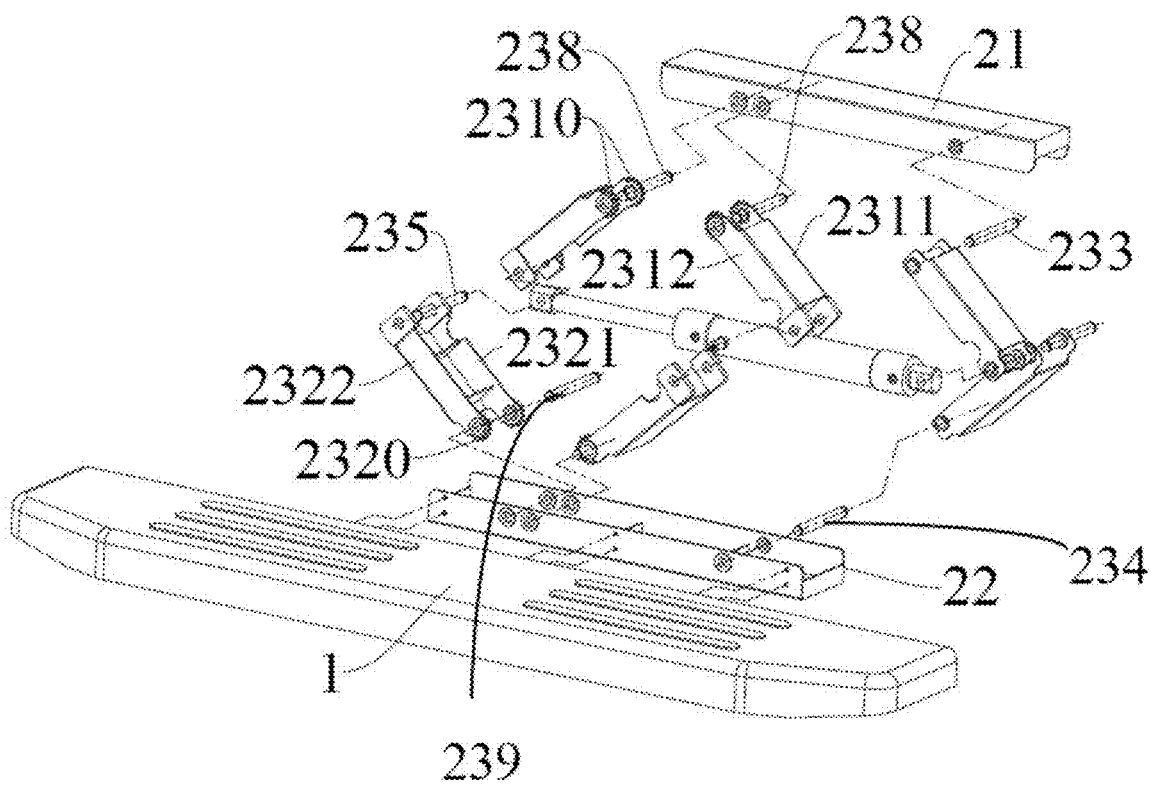
FIG. 7 is an exploded view of a step apparatus for a vehicle according to another embodiment of the present disclosure.

As illustrated in FIGS. 5, 6, and 7, the step apparatus 100 for the vehicle according to the embodiment of the present disclosure includes a step 1, a lifting device 2, and a driver 3.

The lifting device 2 includes an arm assembly 23. The arm assembly 23 includes a plurality of pairs of arms. Each pair of arms includes a first arm 231 and a second arm 232, and a second end of the second arm 232 of each pair of arms (i.e., a lower end of the second arm 232 in FIG. 5) is pivotably connected to the step 1, and the plurality of pairs of arms include at least a first driving arm pair and/or a second driving arm pair. As illustrated in FIGS. 5, 6, and 7, two driving arm pairs 201 are included in the arm assembly 23, one driving arm pair 201 being the first driving arm pair, and the other driving arm pair 201 being the second driving arm pair.

A second end of the first arm 231 of the first driving arm pair (i.e., an upper end of the first arm 231 of the first driving arm pair as illustrated in FIGS. 5, 6, and 7) is connected to a second end of the first arm 231 of the second driving arm pair (i.e., an upper end of the first arm 231 of the second driving arm pair as illustrated in FIGS. 5, 6, and 7) by gear transmission, and/or a second end of the second arm 232 of the first driving arm pair (i.e., a lower end of the second arm 232 of the first driving arm pair as illustrated in FIGS. 5, 6, and 7) is connected to a second end of the second arm 232 of the second driving arm pair (i.e., a lower end of the second arm 232 of the second driving arm pair as illustrated in FIGS. 5, 6, and 7) by gear transmission. In other words, only the second ends of the first arms 231 of the first driving arm pair and the second driving arm pair may be connected by gear transmission, or only the second ends of the second arms 232 of the first driving arm pair and the second driving arm pair may be connected by gear transmission, or the second ends of the first arms 231 of the first driving arm pair and the second driving arm pair may be connected by gear transmission, and also the second ends of the second arms 232 of the first driving arm pair and the second driving arm pair may be connected by gear transmission.

A first end of the first arm 231 and a first end of the second arm 232 of each pair of arms are pivotably connected to the driver 3, and are configured to drive the arm assembly 23 to be unfolded and folded to adjust a level of the step 1. As illustrated in FIGS. 1, 5, and 6, the driver 3 is a linear driver. The linear driver can be extended and retracted for linear movements. When the linear driver is retracted, at least one of the first arm 231 and/or the second arm 232 rotates in a direction of being folded together towards each other, so that the step 1 moves closer to the bottom surface 210 of the vehicle body to increase a height of the step 1. When the linear driver is extended, at least one of the first arm 231 and/or the second arm 232 can rotate in a direction of being unfolded relative to each other from being folded together, so that the step 1 moves away from the bottom surface 210 of the vehicle body to reduce the height of the step 1. Specifically, the linear driver may be a hydraulic cylinder, an air cylinder, an electric push rod, or the like.

In the step apparatus 100 for the vehicle according to the embodiment of the present disclosure, the arm assembly 23 of the lifting device 2 is connected to the step 1, and the first arm 231 and the second arm 232 of the arm assembly 23 can be unfolded and folded under the drive of the driver 3. The first arms 231 and/or the second arms 232 of adjacent driving arm pairs 201 are connected by gear transmission to ensure the synchronization of the adjacent driving arm pairs 201, which facilitates adjustment of the level of the step 1, thus providing a simple structure, good stability, and good flexibility, and improving applicability.

In some embodiments, the step 1 has a side bar position, a step position, and a jack position. In the side bar position, the step 1 is located at a lower edge of a side face of the vehicle body 200. In the step position, the step 1 is located between the side bar position and the ground. In the jack position, the step 1 abuts against the ground to be configured to jack up the vehicle body 200.

Figure 2:
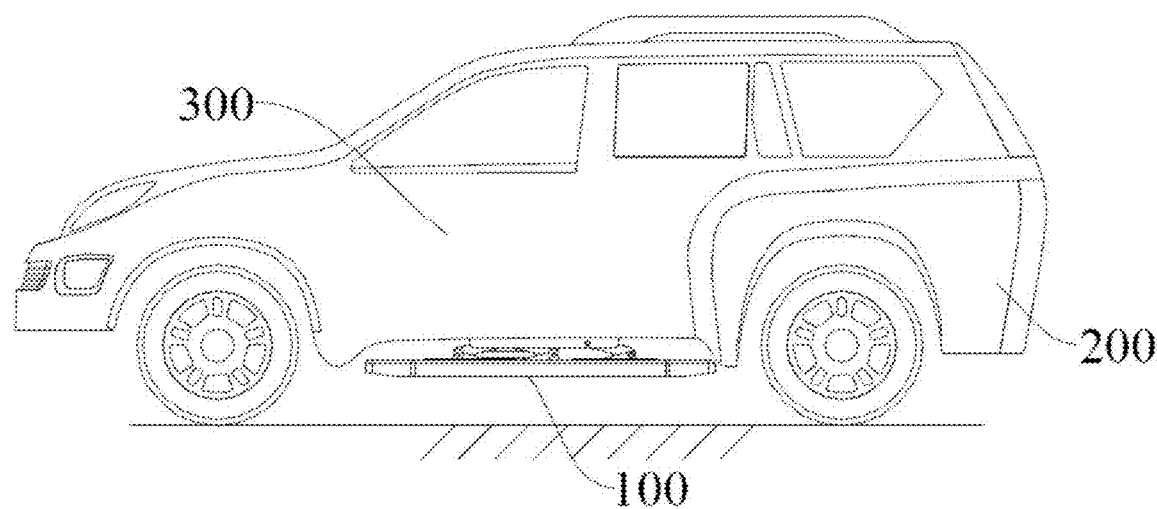
FIG. 2 is a perspective view of the vehicle illustrated in FIG. 1, in which a step is in a side bar position.

As illustrated in FIG. 2, when the first arm 231 and the second arm 232 are in a fully folded state, the step 1 has the closest distance from the bottom surface 210 of the vehicle body in an up-down direction, so as to be located at the side bar position, that is, the step 1 is located at the lower edge of the side face of the vehicle body 200, and the step 1 exceeds a width of the vehicle body 200 in a width direction of the vehicle body 200 (i.e., a front-rear direction in FIG. 1), so that the step 1 can serve as a bumper of the vehicle body 200 to provide a protective function to protect the vehicle body 200, thus preventing the vehicle 1000 from being hit or scratched.

Figure 3:
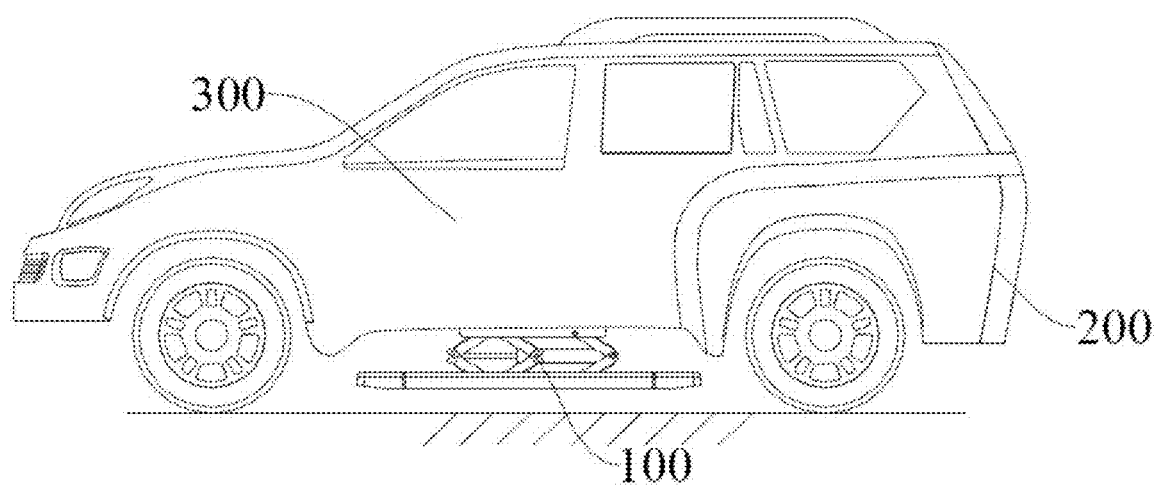
FIG. 3 is a schematic view of the vehicle illustrated in FIG. 1, in which a step is in a step position.

As illustrated in FIG. 3, when the first arm 231 and the second arm 232 are unfolded from the fully folded state to a first unfolded state, the step 1 moves downwards away from the side bar position and is higher than the ground, and a person can get into the vehicle by the step 1.

Figure 4:
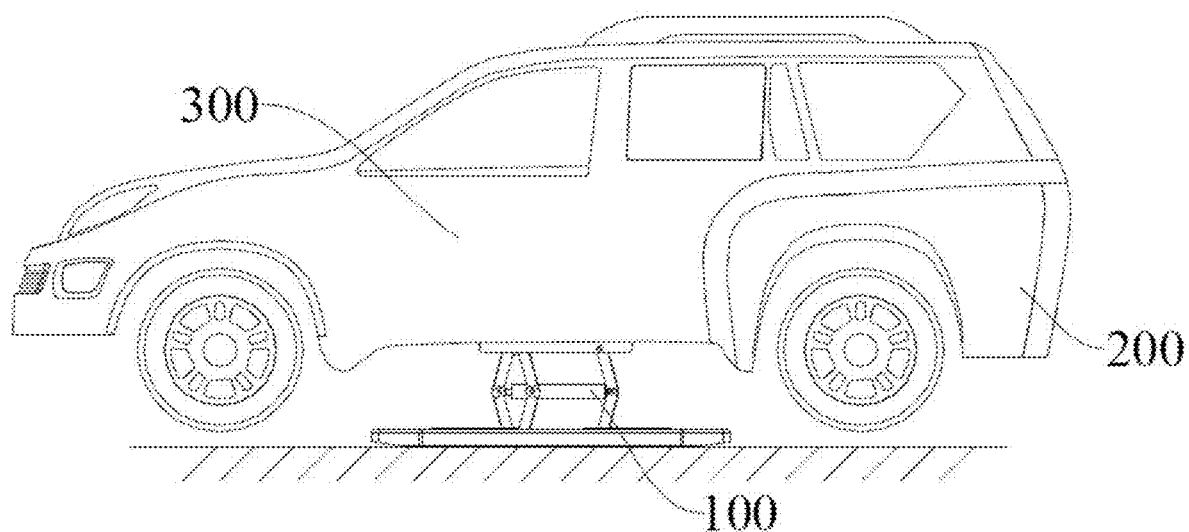
FIG. 4 is a perspective view of the vehicle illustrated in FIG. 1, in which a step is in a jack position.

As illustrated in FIG. 4, when the first arm 231 and the second arm 232 continue to be unfolded from the first unfolded state to a second unfolded state, the step 1 continues to move downwards to abut against the ground so as to lift up the vehicle body 200. Tires of the vehicle 1000 are separated from the ground for repair of the vehicle, thereby acting as a jack.

In some embodiments, the lifting device 2 further includes a mounting base 21 and a step base 22. The step 1 is mounted to the step base 22. The mounting base 21 is adapted to be mounted to the bottom surface 210 of the vehicle body. The second end of the first arm 231 of each pair of arms (i.e., the upper end of the first arm 231 as illustrated in FIGS. 5, 6, and 7) is pivotably connected to the mounting base 21, and the second end of the second arm 232 of each pair of arms (i.e., the lower end of the second arm 232 as illustrated in FIGS. 5, 6, and 7) is pivotably connected to the step base 22.

Specifically, the mounting base 21 includes a first side wall 211 and a second side wall 212 spaced apart in the front-rear direction, and a first U-shaped groove 213 is formed between the first side wall 211 and the second side wall 212. The upper end of the first arm 231 of each pair of arms is arranged in (e.g., coupled) the first U-shaped groove 213 and is pivotably connected to the first side wall 211 and the second side wall 212.

The step base 22 includes a third side wall 221 and a fourth side wall 222 spaced apart in the front-rear direction, and a second U-shaped groove 223 is formed between the third side wall 221 and the fourth side wall 222. The lower end of the second arm 232 of each pair of arms is arranged in (e.g., coupled) the second U-shaped groove 223 and is pivotably connected to the third side wall 221 and the fourth side wall 222.

In some embodiments, the step apparatus for the vehicle further includes a gear box 4, the gear box 4 includes a housing 41, a first gear 42, and a second gear 43, and the housing 41 is mounted to at least one of the mounting base 21 and/or the step base 22. For example, as illustrated in FIGS. 5 and 6, a top surface of the housing 41 of one gear box 4 is connected to the mounting base 21, and a top surface of the mounting base 21 is fixedly connected to the bottom surface 210 of the vehicle body; and/or, a bottom surface of the housing 41 of the other gear box 4 is connected to the step base 22, and the step 1 is mounted to the step base 22.

Specifically, at least part of the housing 41 of one gear box 4 is arranged in (e.g., coupled to) the first U-shaped groove 213 and is fixedly connected to a bottom surface of the first U-shaped groove 213. At least part of the housing 41 of the other gear box 4 is arranged in (e.g., coupled to) the second U-shaped groove 223 and is fixedly connected to a bottom surface of the second U-shaped groove 223.

The first gear 42 and the second gear 43 are mounted in the housing 41 and mesh with each other. The second end of at least one of the first arm 231 and/or the second arm 232 of the first driving arm pair (i.e., at least one of the upper end of the first arm 231 and/or the lower end of the second arm 232 of the first driving arm pair in FIGS. 5 and 6) is connected to a gear shaft of the first gear 42, and the second end of at least one of the first arm 231 and/or the second arm 232 of the second driving arm pair (i.e., at least one of the upper end of the first arm 231 and/or the lower end of the second arm 232 of the second driving arm pair in FIGS. 5 and 6) is connected to a gear shaft of the second gear 43.

In some specific embodiments, the gear box 4 includes a first gear box and a second gear box. The housing 41 of the first gear box is mounted to the mounting base 21, and the housing 41 of the second gear box is mounted to the step base 22. The gear shaft of the first gear 42 of the first gear box is connected to the second end of the first arm 231 of the first driving arm pair (i.e., the upper end of the first arm 231 of the first driving arm pair in FIGS. 5 and 6). The gear shaft of the second gear 43 of the first gear box is connected to the second end of the first arm 231 of the second driving arm pair (i.e., the upper end of the first arm 231 of the second driving arm pair in FIGS. 5 and 6). The gear shaft of the first gear 42 of the second gear box is connected to the second end of the second arm 232 of the first driving arm pair (i.e., the lower end of the second arm 232 of the first driving arm pair in FIGS. 5 and 6), and the gear shaft of the second gear 43 of the second gear box is connected to the second end of the second arm 232 of the second driving arm pair (i.e., the lower end of the second arm 232 of the second driving arm pair in FIGS. 5 and 6).

As illustrated in FIGS. 5 and 6, the housing 41 of one gear box 4 is connected to the bottom surface 210 of the vehicle body, the first gear 42 of this gear box 4 is arranged in the housing 41, and the gear shaft of the first gear 42 extends out of the housing 41. The extending part of the gear shaft of the first gear 42 is connected to the upper end of the first arm 231 of the first driving arm pair. The second gear 43 of this gear box 4 is arranged in the housing 41 and the gear shaft of the second gear 43 extends out of the housing 41. The extending part of the gear shaft of the second gear 43 is connected to the upper end of the first arm 231 of the second driving arm pair.

The bottom surface of the housing 41 of the other gear box 4 is fixedly connected to the step base 22, the lower end of the second arm 232 of the first driving arm pair is connected to the gear shaft of the first gear 42 of the other gear box 4, and the lower end of the second arm 232 of the second driving arm pair is connected to the gear shaft of the second gear 43 of the other gear box 4.

Specifically, the lower end of the first arm 231 and the upper end of the second arm 232 of the first driving arm pair are pivotably connected to the linear driver, and the lower end of the first arm 231 and the upper end of the second arm 232 of the second driving arm pair are pivotably connected to the linear driver. Therefore, when the linear driver is extended and contracted, under the action of the one gear box 4 and the other gear box 4 described above, the first arm 231 and the second arm 232 of the driving arm pair 201 can maintain synchronous movements, i.e., both rotate in the direction of being folded together towards each other, or both rotate in a direction of moving away from each other to be unfolded.

The gear transmission between the first arms 231 of the two driving arm pairs 201 or the gear transmission between the second arms 232 of the two driving arm pairs 201 is not limited to the embodiment illustrated in FIGS. 5 and 6. For example, in other embodiments, as illustrated in FIG. 7, the second end of the first arm 231 of the first driving arm pair (i.e., the upper end of the first arm 231 of the first driving arm pair in FIG. 7) and the second end of the first arm 231 of the second driving arm pair (i.e., the upper end of the first arm 231 of the second driving arm pair in FIG. 7) are each provided with a plurality of first gear teeth 2310, and the first gear teeth 2310 of the first arm 231 of the first driving arm pair mesh with the first gear teeth 2310 of the first arm 231 of the second driving arm pair; and/or, the second end of the second arm 232 of the first driving arm pair (i.e., the lower end of the second arm 232 of the first driving arm pair in FIG. 7) and the second end of the second arm 232 of the second driving arm pair (i.e., the lower end of the second arm 232 of the second driving arm pair in FIG. 7) are each provided with a plurality of second gear teeth 2320, and the second gear teeth 2320 of the second arm 232 of the first driving arm pair mesh with the second gear teeth 2320 of the second arm 232 of the second driving arm pair. Therefore, the first driving arm pair meshes with the second driving arm pair through the gear teeth of the second end of the first arm 231 and/or through the gear teeth of the second end of the second arm 232, so as to achieve the synchronous movements of the first driving arm pair and the second driving arm pair.

In some specific embodiments, in the driving arm pair 201, the first arm 231 includes a first side plate 2311 and a second side plate 2312 arranged opposite to and spaced apart from each other, and the second arm 232 includes a first side plate 2321 and a second side plate 2322 arranged opposite to and spaced apart from each other. The second end of the first side plate 2311 and the second end of the second side plate 2312 of the first arm are pivotably connected to the mounting base 21, and the second end of the first side plate 2321 and the second end of the second side plate 2322 of the second arm are pivotably connected to the step base 22.

In the driving arm pair 201, the second end of the first side plate 2311 of the first arm and the second end of the second side plate 2312 of the first arm are each provided with a plurality of first gear teeth 2310. The first gear teeth 2310 of the second end of the first side plate 2311 of the first arm of the first driving arm pair mesh with the first gear teeth 2310 of the second end of the first side plate 2311 of the first arm of the second driving arm pair. The first gear teeth 2310 of the second end of the second side plate 2312 of the first arm of the first driving arm pair mesh with the first gear teeth 2310 of the second end of the second side plate 2312 of the first arm of the second driving arm pair.

And/or, in the driving arm pair 201, the second end of the first side plate 2321 of the second arm and the second end of the second side plate 2322 of the second arm are each provided with a plurality of second gear teeth 2320. The second gear teeth 2320 of the second end of the first side plate 2321 of the second arm of the first driving arm pair mesh with the second gear teeth 2320 of the second end of the first side plate 2321 of the second arm of the second driving arm pair. The second gear teeth 2320 of the second end of the second side plate 2322 of the second arm of the first driving arm pair mesh with the second gear teeth 2320 of the second end of the second side plate 2322 of the second arm of the second driving arm pair.

As illustrated in FIG. 7, in the driving arm pair 201, the first side plate 2311 and the second side plate 2312 of the first arm are pivotably connected to the first side wall 211 and the second side wall 212 of the mounting seat 21 through a sixth pin shaft 238. Specifically, the sixth pin shaft 238 extends in the front-rear direction and passes through the upper end of the first side plate 2311 of the first arm and the upper end of the second side plate 2312 of the first arm, a rear end of the sixth pin shaft 238 extends out of the upper end of the first side plate 2311 of the first arm and is pivotably connected to the first side wall 211 of the mounting base 21, and a front end of the sixth pin shaft 238 extends out of the upper end of the second side plate 2312 of the first arm and is pivotably connected to the second side wall 211 of the mounting base 21.

The first side plate 2321 and the second side plate 2322 of the second arm are pivotably connected to the third side wall 221 and the fourth side wall 222 of the step base 22 through a seventh pin shaft 239. Specifically, the seventh pin shaft 239 extends in the front-rear direction and passes through the lower end of the first side plate 2321 and the lower end of the second side plate 2322 of the second arm, a rear end of the seventh pin shaft 239 extends out of the lower end of the first side plate 2321 of the second arm and is pivotably connected to the third side wall 221 of the step base 22, and a front end of the seventh pin shaft 239 extends out of the lower end of the second side plate 2322 of the second arm and is pivotably connected to the fourth side wall 222 of the step base 22.

In some embodiments, the plurality of pairs of arms further include a driven arm pair 202, and the driven arm pair 202 and the driving arm pair 201 are spaced apart in the left-right direction. As illustrated in FIGS. 5, 6, and 7, the first driving arm pair and the second driving arm pair are arranged in order from left to right, and the driven arm pair 202 is located on the right side of the second driving arm pair.

As illustrated in FIGS. 5, 6, and 7, at least one driven arm pair 202 is included in the plurality of pairs of arms. The upper end of the first arm 231 of the driven arm pair 202 is pivotably connected to the mounting base 21, the lower end of the second arm 232 of the driven arm pair 202 is pivotably connected to the step base 22, and the lower end of the first arm 231 of the driven arm pair 202 and the upper end of the second arm 232 of the driven arm pair 202 are pivotably connected to the linear driver.

Specifically, a first pin shaft 233 passes through the upper end of the first arm 231 of the driven arm pair 202 in the front-rear direction, a rear end of the first pin shaft 233 passes through the first side wall 211 from the first U-shaped groove 213 of the mounting base 21 and is pivotably connected to the first side wall 211, and a front end of the first pin shaft 233 passes through the second side wall 212 from the first U-shaped groove 213 of the mounting base 21 and is pivotably connected to the first side wall 211, so that the first arm 231 of the driven arm pair 202 is pivotably connected to the mounting base 21 through the first pin shaft 233.

A second pin shaft 234 passes through the lower end of the second arm 232 of the driven arm pair 202 in the front-rear direction, a rear end of the second pin shaft 234 passes through the third side wall 221 from the second U-shaped groove 223 of the step base 22 and is pivotably connected to the third side wall 213, and a front end of the second pin shaft 234 passes through the fourth side wall 222 from the second U-shaped groove 223 of the step base 22 and is pivotably connected to the fourth side wall 222, so that the second arm 232 of the driven arm pair 202 is pivotably connected to the step base 22 through the second pin shaft 234.

In some embodiments, the driver 3 includes a first end 31 (i.e., a left end of the driver 3, illustrated in FIG. 6), a second end 32 (i.e., a right end of the driver 3, illustrated in FIG. 6), and a connecting part 33 located between the first end 31 and the second end 32. The first end of the first arm 231 of the first driving arm pair and the first end of the second arm 232 of the first driving arm pair are pivotably connected to the first end 31 of the driver, the first end of the first arm 231 of the second driving arm pair and the first end of the second arm of the second driving arm pair are pivotably connected to the connecting part 33 of the driver, and the first end of the first arm 231 of the driven arm pair 202 and the first end of the second arm 232 of the driven arm pair 202 are pivotably connected to the second end 32 of the driver.

As illustrated in FIGS. 5 and 6, two driving arm pairs 201 and one driven arm pair 202 are provided. The connecting part 33 of the driver 3 is located at a substantial center position of the driver 3 in the left-right direction.

A third pin shaft 235 extends in the front-rear direction and passes through the left end of the driver 3. A front end of the third pin shaft 235 passes through a front side wall of the first arm 231 of the first driving arm pair and a front side wall of the second arm 232 of the first driving arm pair and is pivotably connected to the front side wall of the first arm 231 of the first driving arm pair and the front side wall of the second arm 232 of the first driving arm pair. A rear end of the third pin shaft 235 passes through a rear side wall of the first arm 231 of the first driving arm pair and a rear side wall of the second arm 232 of the first driving arm pair and is pivotably connected to the rear side wall of the first arm 231 of the first driving arm pair and the rear side wall of the second arm 232 of the first driving arm pair. Thus, the lower end of the first arm 231 of the first driving arm pair and the upper end of the second arm 232 of the first driving arm pair are pivotably connected through the third pin shaft 235.

A fourth pin shaft 236 extends in the front-rear direction and passes through the connecting part 33 of the driver 3. A front end of the fourth pin shaft 236 passes through a front side wall of the first arm 231 of the second driving arm pair and a front side wall of the second arm 232 of the second driving arm pair and is pivotably connected to the front side wall of the first arm 231 of the second driving arm pair and the front side wall of the second arm 232 of the second driving arm pair. A rear end of the fourth pin shaft 236 passes through a rear side wall of the first arm 231 of the second driving arm pair and a rear side wall of the second arm 232 of the second driving arm pair and is pivotably connected to the rear side wall of the first arm 231 of the second driving arm pair and the rear side wall of the second arm 232 of the second driving arm pair. Thus, the lower end of the first arm 231 of the second driving arm pair and the upper end of the second arm 232 of the second driving arm pair are pivotably connected through the fourth pin shaft 236.

A fifth pin shaft 237 extends in the front-rear direction and passes through the right end of the driver 3. A front end of the fifth pin shaft 237 passes through a front side wall of the first arm 231 of the driven arm pair 202 and a front side wall of the second arm 232 of the driven arm pair 202 and is pivotably connected to the front side wall of the first arm 231 of the driven arm pair 202 and the front side wall of the second arm 232 of the driven arm pair 202. A rear end of the fifth pin shaft 237 passes through a rear side wall of the first arm 231 of the driven arm pair 202 and a rear side wall of the second arm 232 of the driven arm pair 202 and is pivotably connected to the rear side wall of the first arm 231 of the driven arm pair 202 and the rear side wall of the second arm 232 of the driven arm pair 202. Thus, the lower end of the first arm 231 of the driven arm pair 202 and the upper end of the second arm 232 of the driven arm pair 202 are pivotably connected through the fifth pin shaft 237.

In some embodiments, the first arm 231 and the second arm 232 of each pair of arms are arranged symmetrically. As illustrated in FIGS. 5 and 6, the arm assembly 23 has a center line extending in the left-right direction, and the first arm 231 and the second arm 232 of each pair of arms are arranged symmetrically with respect to the center line.

In some embodiments, the first arm 231 and the second arm 232 of each pair of arms are inclined from the driver 3 to an inner side or an outer side of the arm assembly 23. As illustrated in FIGS. 5 and 6, the joint between the upper end of the first arm 231 and the first gear 42 of the first gear box 4 is located at an inner side of the joint between the lower end of the first arm 231 and the driver 3. Specifically, the first arm 231 rotates clockwise downwards, and the second arm 232 rotates counterclockwise upwards, so as to realize the folding of the first arm 231 and the second arm 232. The first arm 231 rotates counterclockwise upwards, and the second arm 232 rotates clockwise downwards, so as to realize the unfolding of the first arm 231 and the second arm 232.

Reference throughout this specification to "an embodiment," "some embodiments," "an example," "a specific example," or "some examples" means that a particular feature, structure, material, or characteristic described in connection with the embodiment or example is included in at least one embodiment or example of the present disclosure. Thus, the appearances of phrases such as "in some embodiments," "in one embodiment," "in an example," "in a specific example," or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, those skilled in the related art may combine and incorporate different embodiments or examples and their features described in the specification, without mutual contradictions.

In the present disclosure, unless specified or limited otherwise, a structure in which a first feature is "on" or "below" a second feature may include an embodiment in which the first feature is in direct contact with the second feature, and may also include an embodiment in which the first feature is in indirect contact with the second feature through intermediaries. Furthermore, a first feature "on," "above," or "on top of" a second feature may include an embodiment in which the first feature is right "on," "above," or "on top of" the second feature, and may also include an embodiment in which the first feature is diagonally "on," "above," or "on top of" the second feature, or just means that the first feature is at a height higher than that of the second feature. A first feature "beneath," "below," or "on bottom of" a second feature may include an embodiment in which the first feature is right "beneath," "below," or "on bottom of" the second feature, and may also include an embodiment in which the first feature is diagonally "beneath," "below," or "on bottom of" the second feature, or just means that the first feature is at a height lower than that of the second feature.

In the descriptions, unless specified or limited otherwise, the terms "mounted," "connected," "coupled," and "fixed" and variations thereof should be understood broadly. For example, these may be permanent connections, detachable connections or integrated; mechanical connections, electrical connections or communicated with each other; direct connections or indirect connections through intermediaries; intercommunication or interaction relationships of two elements, unless specified or limited otherwise. Those skilled in the related art may understand specific meanings of the above terms in the present disclosure according to specific situations.

Although explanatory embodiments have been illustrated and described, it would be appreciated by those skilled in the art that the above embodiments cannot be construed to limit the present disclosure, and changes, alternatives, and modifications can be made in the embodiments without departing from the spirit, principles, and scope of the present disclosure.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A step apparatus for a vehicle, comprising:
   a step;
   a lifting device comprising an arm assembly, the arm assembly comprising a plurality of pairs of arms, each pair of arms comprising a first arm and a second arm; and
   a driver pivotably connected to a first end of the first arm and a first end of the second arm of each pair of arms, a second end of the second arm of each pair of arms being pivotably connected to the step, a second end of the first arm of each pair of arms being pivotably connected to the vehicle, and the driver being configured to drive the arm assembly to be unfolded and folded to adjust a level of the step,
   wherein the plurality of pairs of arms comprise at least a first driving arm pair or a second driving arm pair, the first driving arm pair and the second driving arm pair are configured in at least one of: the second end of the first arm of the first driving arm pair and the second end of the first arm of the second driving arm pair are connected through gear transmission, or, the second end of the second arm of the first driving arm pair and the second end of the second arm of the second driving arm pair are connected through gear transmission.

2. The step apparatus for the vehicle according to claim 1, wherein the step has a side bar position, a step position, and a jack position, and wherein:
   in the side bar position, the step is located at a lower edge of a side face of the vehicle body,
   in the step position, the step is located between the side bar position and the ground, and
   in the jack position, the step abuts against the ground and is configured to jack up the vehicle body.

3. The step apparatus for the vehicle according to claim 1, wherein the lifting device further comprises a mounting base and a step base, wherein the step is mounted to the step base, the mounting base is configured to be mounted to a bottom surface of a vehicle body of the vehicle, the second end of the first arm of each pair of arms is pivotably connected to the mounting base, and the second end of the second arm of each pair of arms is pivotably connected to the step base.

4. The step apparatus for the vehicle according to claim 3, further comprising a gear box, wherein the gear box comprises a housing, a first gear, and a second gear, wherein the housing is mounted to at least one of the mounting base or the step base, the first gear and the second gear are mounted in the housing and mesh with each other, the second end of at least one of the first arm or the second arm of the first driving arm pair is connected to a gear shaft of the first gear, and the second end of at least one of the first arm or the second arm of the second driving arm pair is connected to a gear shaft of the second gear.

5. The step apparatus for the vehicle according to claim 4, wherein the gear box comprises a first gear box and a second gear box, wherein the housing of the first gear box is mounted to the mounting base, the housing of the second gear box is mounted to the step base, the gear shaft of the first gear of the first gear box is connected to the second end of the first arm of the first driving arm pair, the gear shaft of the second gear of the first gear box is connected to the second end of the first arm of the second driving arm pair, the gear shaft of the first gear of the second gear box is connected to the second end of the second arm of the first driving arm pair, and the gear shaft of the second gear of the second gear box is connected to the second end of the second arm of the second driving arm pair.

6. The step apparatus for the vehicle according to claim 3, wherein the second end of the first arm of the first driving arm pair and the second end of the first arm of the second driving arm pair are each provided with a plurality of first gear teeth, wherein the first gear teeth of the first arm of the first driving arm pair mesh with the first gear teeth of the first arm of the second driving arm pair.

7. The step apparatus for the vehicle according to claim 6, wherein, in the driving arm pair, both the first arm and the second arm comprise a first side plate and a second side plate, the first side plate and the second side plate are arranged opposite to and spaced apart from each other, the second end of the first side plate of the first arm and the second end of the second side plate of the first arm are pivotably connected to the mounting base, the second end of the first side plate of the second arm and the second end of the second side plate of the second arm are pivotably connected to the step base,
   wherein the second end of the first side plate of the first arm and the second end of the second side plate of the first arm are each provided with the plurality of first gear teeth, the first gear teeth of the second end of the first side plate of the first arm of the first driving arm pair mesh with the first gear teeth of the second end of the first side plate of the first arm of the second driving arm pair, the first gear teeth of the second end of the second side plate of the first arm of the first driving arm pair mesh with the first gear teeth of the second end of the second side plate of the first arm of the second driving arm pair mesh with each other.

8. The step apparatus for the vehicle according to claim 3, wherein the second end of the second arm of the first driving arm pair and the second end of the second arm of the second driving arm pair are each provided with a plurality of second gear teeth, the second gear teeth of the second arm of the first driving arm pair mesh with the second gear teeth of the second arm of the second driving arm pair.

9. The step apparatus for the vehicle according to claim 8, wherein in the driving arm pair, both the first arm and the second arm comprise a first side plate and a second side plate, the first side plate and the second side plate are arranged opposite to and spaced apart from each other, the second end of the first side plate of the first arm and the second end of the second side plate of the first arm are pivotably connected to the mounting base, the second end of the first side plate of the second arm and the second end of the second side plate of the second arm are pivotably connected to the step base,
   wherein the second end of the first side plate of the second arm and the second end of the second side plate of the second arm are each provided with the plurality of second gear teeth, the second gear teeth of the second end of the first side plate of the second arm of the first driving arm pair mesh with the second gear teeth of the second end of the first side plate of the second arm of the second driving arm pair, the second gear teeth of the second end of the second side plate of the second arm of the first driving arm pair mesh with the second gear teeth of the second end of the second side plate of the second arm of the second driving arm pair.

10. The step apparatus for the vehicle according to claim 3, wherein the second end of the first arm of the first driving arm pair and the second end of the first arm of the second driving arm pair are each provided with a plurality of first gear teeth, the first gear teeth of the first arm of the first driving arm pair mesh with the first gear teeth of the first arm of the second driving arm pair,
the second end of the second arm of the first driving arm pair and the second end of the second arm of the second driving arm pair are each provided with a plurality of second gear teeth, the second gear teeth of the second arm of the first driving arm pair mesh with the second gear teeth of the second arm of the second driving arm pair.

11. The step apparatus for the vehicle according to claim 10, wherein in the driving arm pair, both the first arm and the second arm comprise a first side plate and a second side plate, the first side plate and the second side plate are arranged opposite to and spaced apart from each other, the second end of the first side plate of the first arm and the second end of the second side plate of the first arm are pivotably connected to the mounting base, the second end of the first side plate of the second arm and the second end of the second side plate of the second arm are pivotably connected to the step base,
wherein the second end of the first side plate of the first arm and the second end of the second side plate of the first arm are each provided with the plurality of first gear teeth, the first gear teeth of the second end of the first side plate of the first arm of the first driving arm pair mesh with the first gear teeth of the second end of the first side plate of the first arm of the second driving arm pair, the first gear teeth of the second end of the second side plate of the first arm of the first driving arm pair mesh with the first gear teeth of the second end of the second side plate of the first arm of the second driving arm pair mesh with each other;
the second end of the first side plate of the second arm and the second end of the second side plate of the second arm are each provided with the plurality of second gear teeth, the second gear teeth of the second end of the first side plate of the second arm of the first driving arm pair mesh with the second gear teeth of the second end of the first side plate of the second arm of the second driving arm pair, the second gear teeth of the second end of the second side plate of the second arm of the first driving arm pair mesh with the second gear teeth of the second end of the second side plate of the second arm of the second driving arm pair.

12. The step apparatus for the vehicle according to claim 3, wherein the plurality of pairs of arms further comprise a driven arm pair, and the driving arm pair and the driven arm pair are arranged at intervals.

13. The step apparatus for the vehicle according to claim 12, wherein the driver comprises a first end, a second end, and a connecting part between the first end and the second end, the first end of the first arm of the first driving arm pair and the first end of the second arm of the first driving arm pair are pivotably connected to the first end of the driver, the first end of the first arm of the second driving arm pair and the first end of the second arm of the second driving arm pair are pivotably connected to the connecting part of the driver, the first end of the first arm of the driven arm pair and the first end of the second arm of the driven arm pair are pivotably connected to the second end of the driver.

14. The step apparatus for the vehicle according to claim 1, wherein the first arm and the second arm of each pair of arms are arranged symmetrically.

15. The step apparatus for the vehicle according to claim 14, wherein the first arm and the second arm of each pair of arms are inclined from the driver to an inner side or an outer side of the arm assembly.

16. The step apparatus for the vehicle according to claim 1, wherein the driver is a linear driver.

17. The step apparatus for the vehicle according to claim 16, wherein the linear driver is a hydraulic cylinder, an air cylinder or an electric push rod.

18. A vehicle, comprising:
a vehicle body; and
a step apparatus for a vehicle, wherein the step apparatus for the vehicle is mounted to a bottom surface of the vehicle body,
wherein the step apparatus for the vehicle comprises:
a step;
a lifting device comprising an arm assembly, the arm assembly comprising a plurality of pairs of arms, each pair of arms comprising a first arm and a second arm; and
a driver pivotably connected to a first end of the first arm and a first end of the second arm of each pair of arms, a second end of the second arm of each pair of arms being pivotably connected to the step, a second end of the first arm of each pair of arms being pivotably connected to the vehicle, and the driver being configured to drive the arm assembly to be unfolded and folded to adjust a level of the step,
wherein the plurality of pairs of arms comprise at least a first driving arm pair or a second driving arm pair, the first driving arm pair and the second driving arm pair are configured in at least one of: the second end of the first arm of the first driving arm pair and the second end of the first arm of the second driving arm pair are connected through gear transmission; or, the second end of the second arm of the first driving arm pair and the second end of the second arm of the second driving arm pair are connected through gear transmission.

19. The vehicle according to claim 18, wherein the step has a side bar position, a step position, and a jack position,
in the side bar position, the step is located at a lower edge of a side face of the vehicle body,
in the step position, the step is located between the side bar position and the ground, and
in the jack position, the step abuts against the ground and is configured to jack up the vehicle body.

20. The vehicle according to claim 18, wherein the lifting device further comprises a mounting base and a step base, the step is mounted to the step base, the mounting base is configured to be mounted to a bottom surface of a vehicle body of the vehicle, a second end of the first arm of each pair of arms is pivotably connected to the mounting base, and the second end of the second arm of each pair of arms is pivotably connected to the step base.

* * * * *